(12) United States Patent
Collier

(10) Patent No.: US 6,447,016 B2
(45) Date of Patent: Sep. 10, 2002

(54) PASSIVE LOCKING CAM AND GROOVE COUPLING

(75) Inventor: Tom P. Collier, Brenham, TX (US)

(73) Assignee: National Equipment Corp., Brenham, TX (US)

( * ) Notice: Subject to any disclaimer, the term of this patent is extended or adjusted under 35 U.S.C. 154(b) by 0 days.

(21) Appl. No.: 09/838,615

(22) Filed: Apr. 19, 2001

Related U.S. Application Data
(60) Provisional application No. 60/204,556, filed on May 16, 2000.

(51) Int. Cl.[7] ................................................. F16L 37/20
(52) U.S. Cl. ........................... 285/81; 285/312; 285/85; 285/87
(58) Field of Search ............................... 285/81, 87, 85, 285/88, 312

(56) References Cited

U.S. PATENT DOCUMENTS

| | | | |
|---|---|---|---|
| 3,124,374 A | * | 3/1964 | Krapp ........................ 137/583 |
| 4,295,670 A | * | 10/1981 | Goodall et al. ............. 285/312 |
| 4,647,075 A | * | 3/1987 | Vargo ......................... 285/312 |
| 4,802,694 A | * | 2/1989 | Vargo ......................... 285/312 |
| 5,295,717 A | | 3/1994 | Chen |
| 5,435,604 A | | 7/1995 | Chen |
| 5,816,623 A | * | 10/1998 | Chang ........................ 285/309 |
| 5,911,445 A | * | 6/1999 | Lee ............................ 285/312 |
| 6,015,168 A | | 1/2000 | Fahl |
| 6,047,995 A | * | 4/2000 | Kotake ....................... 285/312 |
| 6,053,540 A | * | 4/2000 | Meyer ........................ 285/312 |
| 6,224,133 B1 | * | 5/2001 | Abramoski et al. .......... 296/75 |

* cited by examiner

Primary Examiner—Eric K. Nicholson

(57) ABSTRACT

A passive locking Cam & Groove female coupling, consisting of a locking latch mounted straddling the exterior of each cam arm attached to the coupling. The latch interlocks with a stop on the coupling body to provide a passive lock when the arm is closed. To open the cam arm, an intentional movement is applied to the latch so that the latch will pivot back and clear the stop thus allowing the cam arm to open.

8 Claims, 7 Drawing Sheets

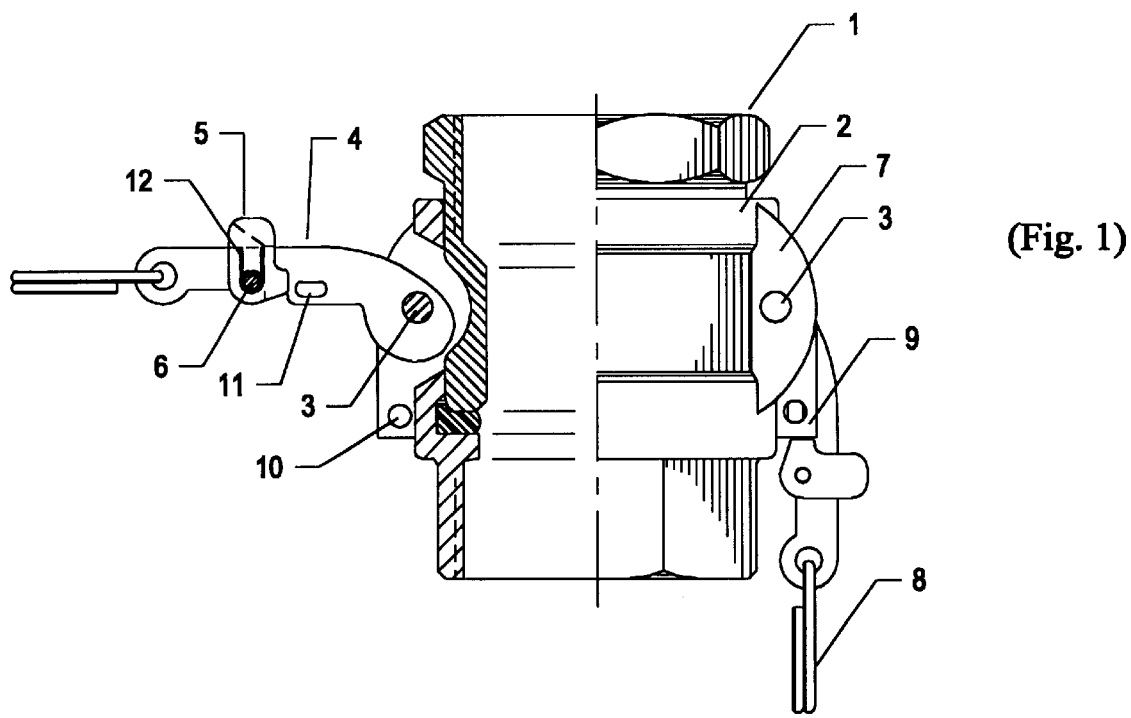
(Fig. 1)
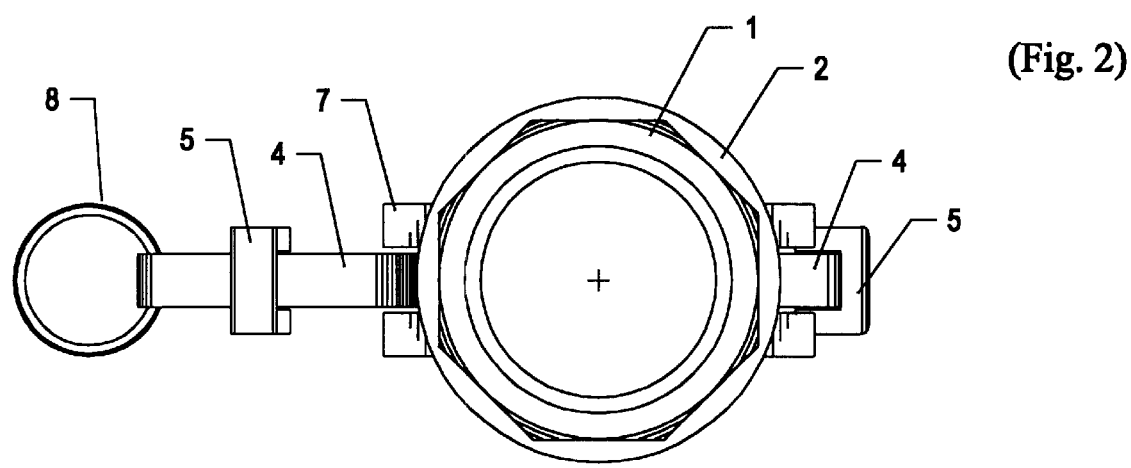
(Fig. 2)

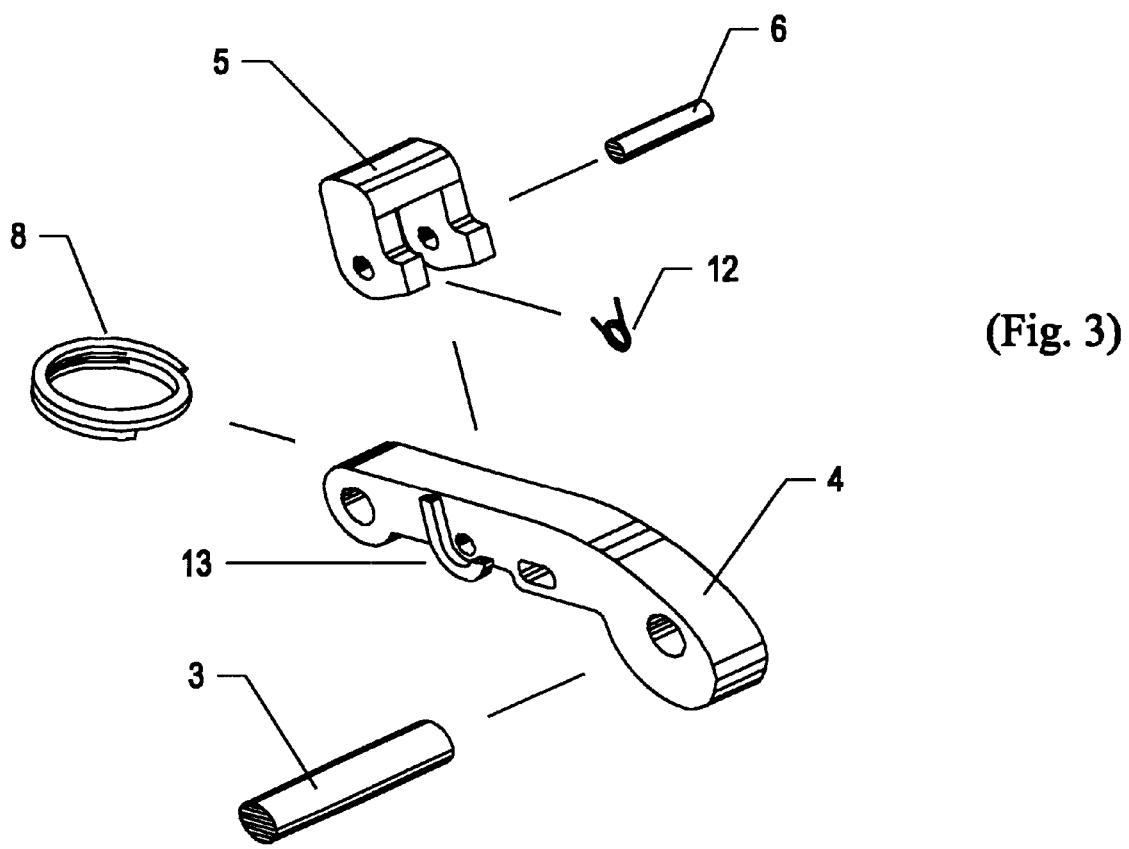
(Fig. 3)

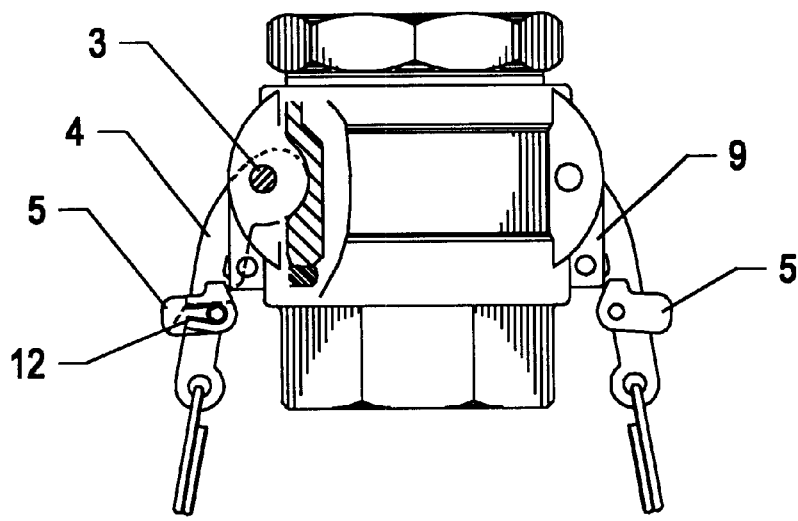
(Fig. 4)
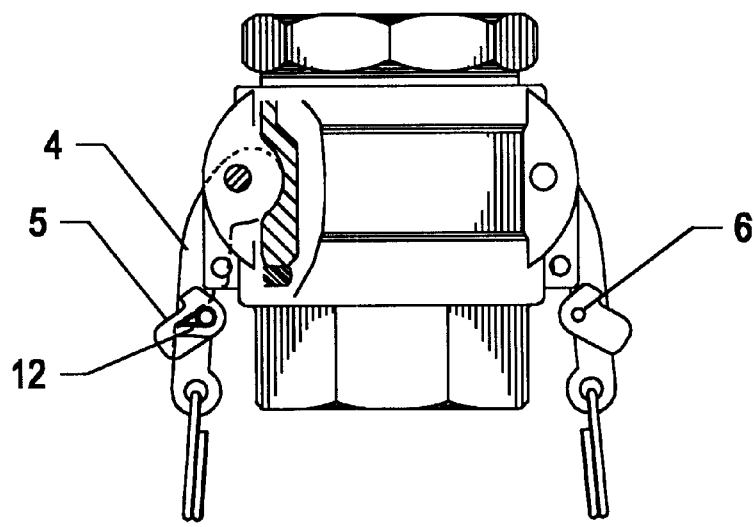
(Fig. 5)
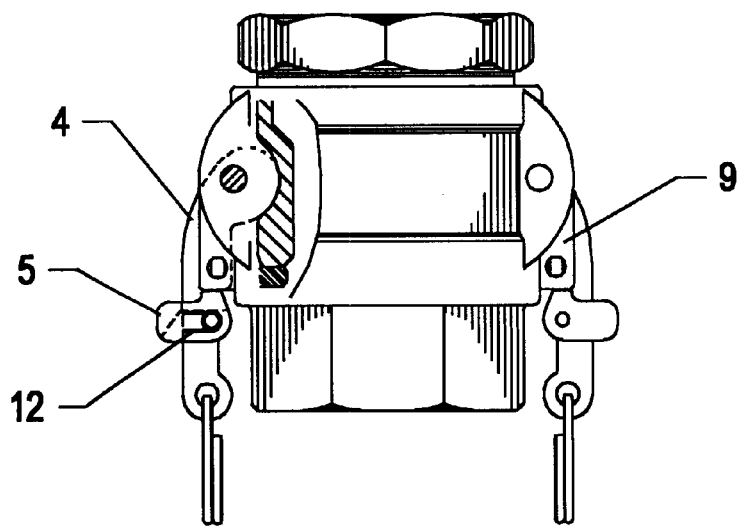
(Fig. 6)

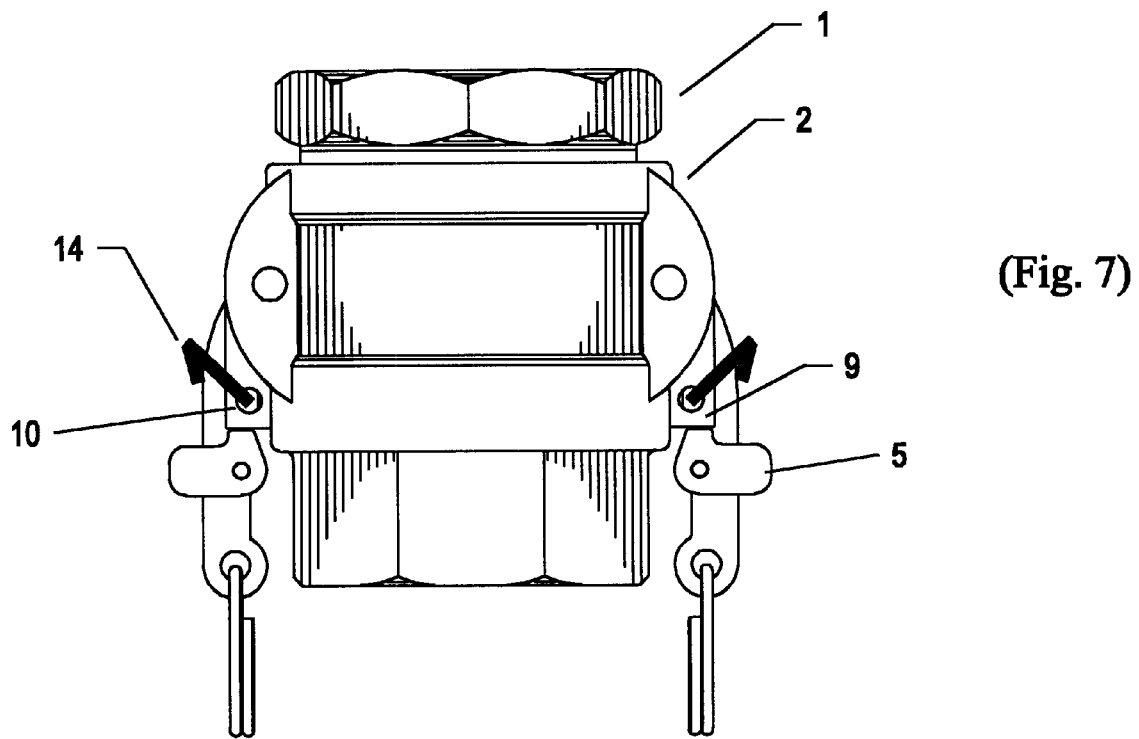
(Fig. 7)
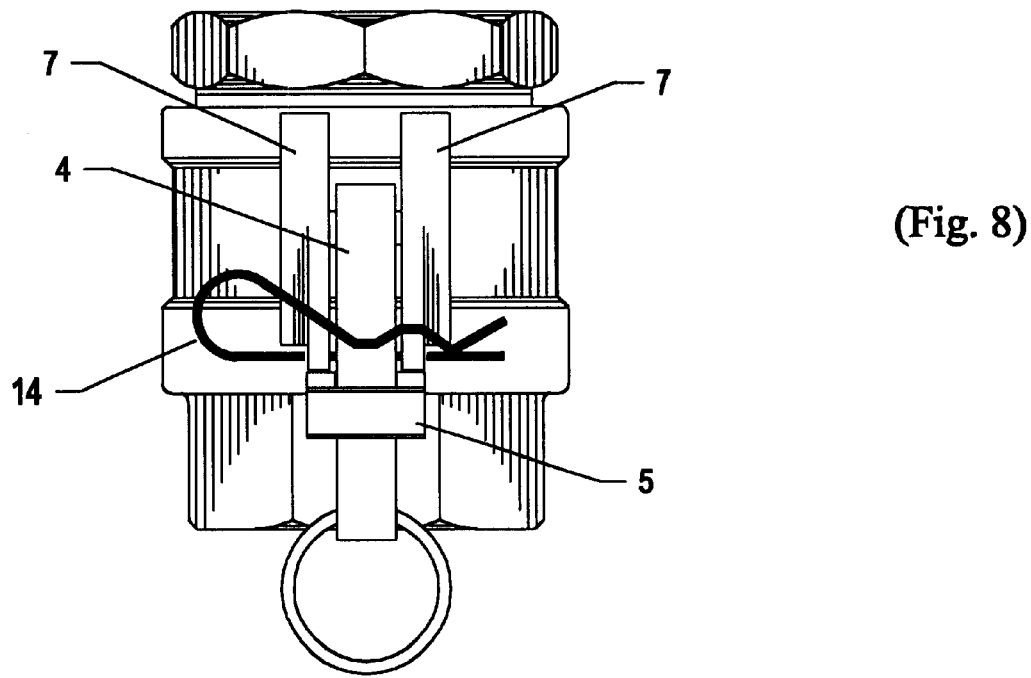
(Fig. 8)

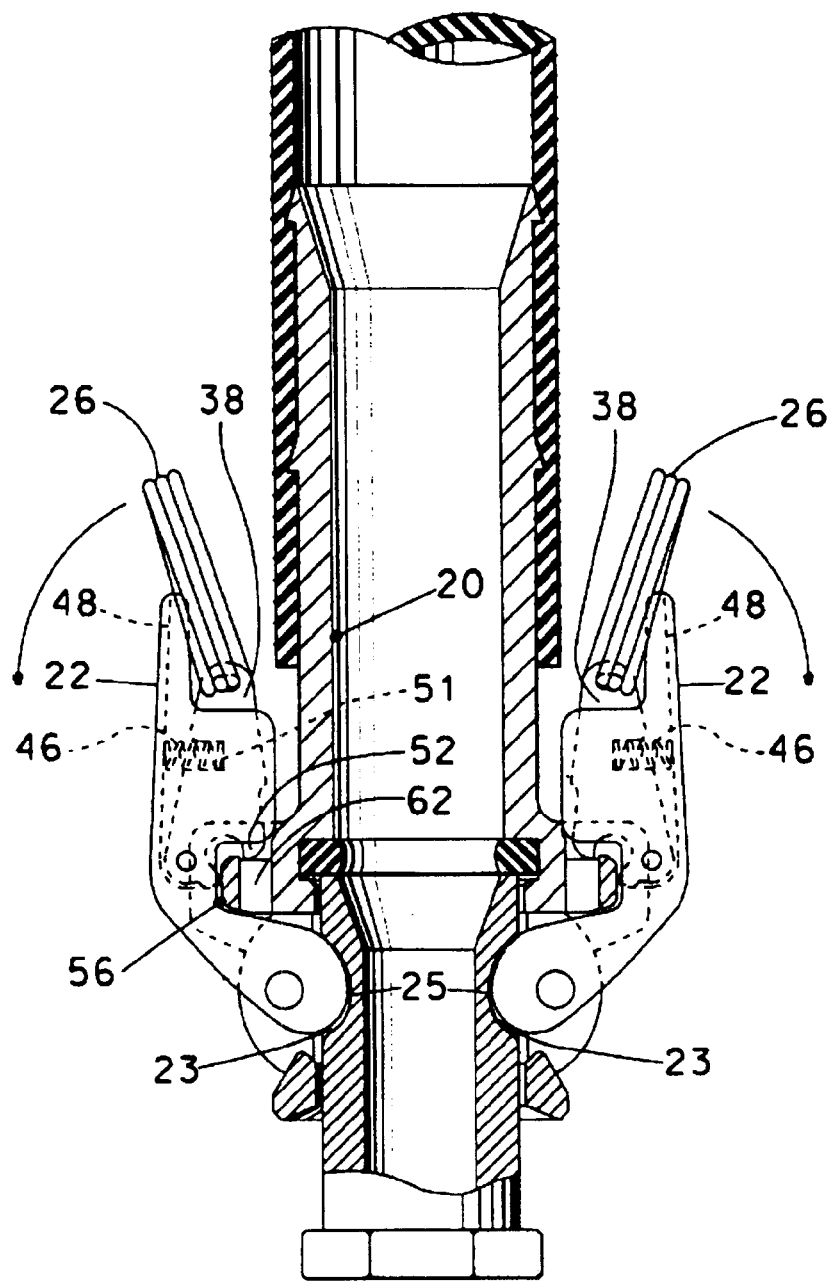
(Fig. 9)
Prior Art
6,015,168

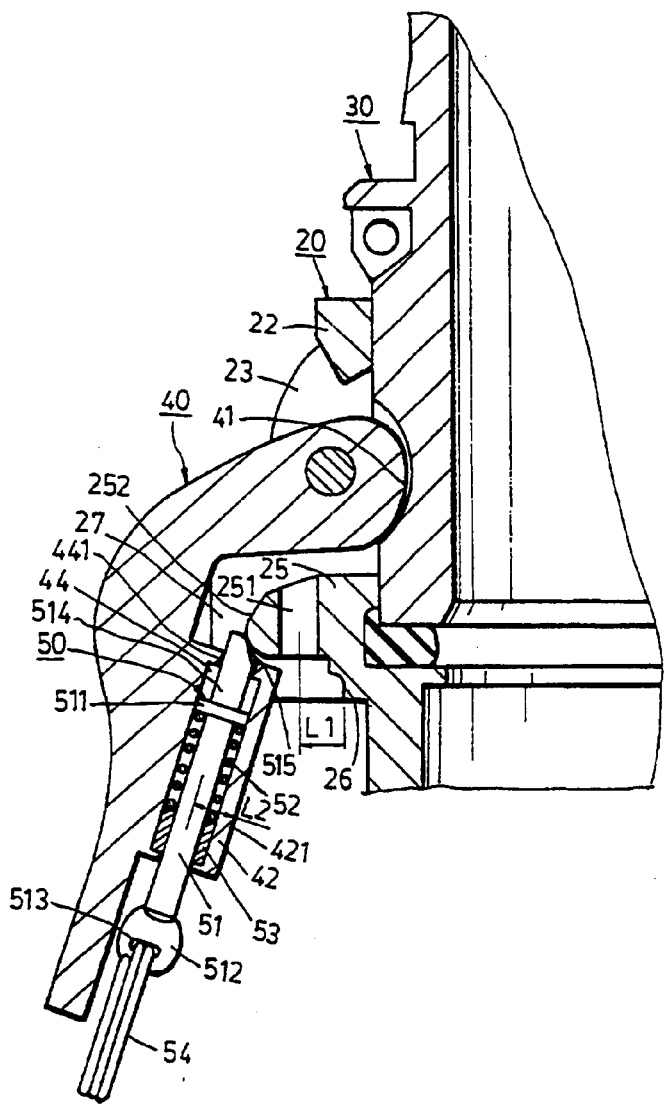
(Fig. 10)
Prior Art
5,435,604

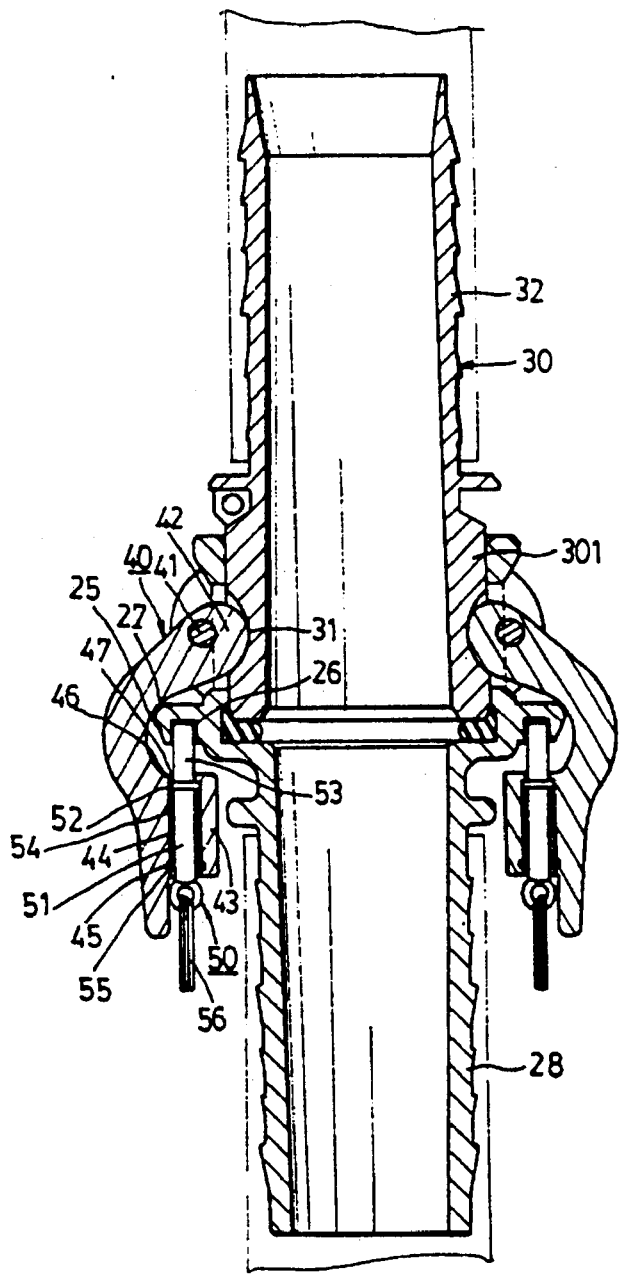
(Fig. 11)
Prior Art
5,295,717

PASSIVE LOCKING CAM AND GROOVE COUPLING

CROSS-REFERENCE TO RELATED APPLICATIONS

Provisional Patent Application No. 60/204,556. Filed May 16, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to the general field of quick disconnect couplings known as Cam & Groove couplings for hose and pipe. Cam & Groove couplings have been in common use for many years as quick disconnect coupling joints for hose and pipe involved in fluid transfer. Cam & Groove couplings consist of a male and a female type coupling. Both male and female couplings are tubular in nature and attach to the ends of hose or pipe for the purpose of connecting and disconnecting the lengths of hose or pipe. Together the two couplings comprise a quick disconnect coupling joint.

The male coupling is constructed with a radial groove around its exterior perimeter. The female coupling is constructed with an interior diameter large enough to accept the insertion of the male coupling into the female coupling's interior. An integral aspect of the female coupling is pivoting cam arms mounted onto the female coupling.

The cam arms are located between two lugs, known as ears. There are two sets of ears on each female coupling; each set is on opposite sides of the coupling body, 180° apart. Each set of ears contains one cam arm assembly. The cam arms pivot on a steel pin between the ears and retain the male coupling inside the female coupling when the cam arms are in the closed position.

Since the integrity of the coupling joint is dependent upon the movement of the cam arms, considerable effort has been employed to devise methods of retaining the cam arms in a closed position to prevent unintentional opening and allowing the coupling joint to become uncoupled. Wire safety clips are used for this purpose and are standard on all major brand couplings. The wire safety clips are inserted by the operator through holes in the female coupling in such a manner so that the wire clip is positioned on the outside of the cam arms where they become an obstruction to the opening arc of the cam arm and prevent the cam arm from opening. This method of retaining the cam arm in the closed position is an active action, requiring the operator to perform the additional task of inserting the clips. A passive method of cam arm retention is preferred, which does not require the operator to take any additional action to ensure that the cam arms can not be unintentionally opened.

U.S. Pat. Nos. 6,015,168 and 5,435,604 and 5,295,717 address the issue of passive cam arm retention in Cam & Groove couplings. These inventions utilize a locking member housed by various methods, inside the cam arm. The locking member in the cam arm interacts with a mating member on the female coupling to accomplish the task of locking the cam arms in the closed position. The locking member located inside the cam arm is attached to the cam arm finger ring. The finger ring is used to release the lock so that the cam arm can be opened. While these inventions work effectively, they have a number of shortcomings.

The most significant shortcoming is that the releasing of the locking mechanism and the opening of the cam arm are both accomplished by a pulling force applied to the finger ring. The same pulling force applied to the finger ring releases the locking mechanism and opens the cam arm. This arrangement can lead to accidental openings of the cam arm. Cam & Groove couplings are widely used in industrial applications with a large percentage of use as hose quick disconnects. The hose assemblies are subject to severe conditions from handling, moving, dropping and otherwise hard service. In situations where hose assemblies are used on the ground, an object can snag the finger ring and hold it firm while the hose assembly is moved thus releasing the locking mechanism and possibly opening the cam arm.

Another shortcoming of the fore mentioned inventions is the dependence on the cam arm finger ring to perform the task of releasing the locking mechanism. The cam arm finger ring is subject to possible impairment, due to the harsh environments to which this type of coupling may be subjected. The finger ring can become damaged, lost or removed, making it difficult to release the locking mechanism.

Still another shortcoming of the fore mentioned inventions is that they have a mating member on the female coupling that the locking mechanism inside the cam arm engages with to retain the cam arm in the closed position. This mating member is cast as an integral part of the female coupling and extends out from the body to protrude into the space normally occupied by a standard cam arm handle. While this arrangement is satisfactory when the specialized locking cam arm designed for that particular brand coupling is used, it is not functional with a standard generic cam arm. The protruding mating member on the female coupling will obstruct and block the rotation needed to complete the closing cycle of a standard generic type cam arm. Should the specifically designed locking cam arm become damaged, jammed or otherwise nonfunctional, a replacement cam arm of the same specialized design must be obtained to restore the coupling to service. Therefore, a standard generic cam arm readily available from numerous sources, will not return the hose assembly to temporary use until a suitable replacement cam arm can be obtained from a specific manufacturer.

SUMMARY OF THE INVENTION

It is the object of this invention to provide a passive locking mechanism for the cam arms on a Cam & Groove coupling without utilizing the finger ring as an integral aspect of operation.

It is another object of this invention to provide a passive locking mechanism for the cam arms on a Cam & Groove coupling that would allow for the removal of said locking mechanism and the substitution of a standard generic cam arm assembly, in the case of emergency field repair.

The present invention is a female Cam & Groove coupling with self locking cam arm assemblies. Each cam arm assembly contains a pivotal locking latch mounted onto the exterior of the cam arm. During the closing cycle of the cam arm, the latch interlocks with the female coupling body in such a manner as to prevent the unintentional opening of the cam arm. The locking latch is self-locking on the closing cycle of the cam arm and manually released by an intentional and secondary action applied by the operator on the opening cycle of the cam arms.

An additional feature of this invention is that in the event the locking cam arm assembly becomes damaged beyond functionality, the entire locking cam arm assembly can be completely removed from the coupling body and replaced with a standard generic cam arm assembly. The female coupling will continue to be operational as a standard Cam & Groove coupling without the passive locking features. As there are no obstructing members on the female coupling body to interfere with the operation of a standard generic cam arm assembly, the female coupling can be emergency field repaired and continue to be of service.

Still another feature of this invention is the optional use of a wire safety clip. Even though the use of a wire safety clip is in common use in today's market as a device for cam arm retention, the combination of a wire safety clip and a passive locking cam arm assembly is not common and further enhances this invention.

BRIEF DESCRIPTION OF THE DRAWINGS (FIG. 1 and FIG. 2) depict a Cam & Groove coupling joint in accordance with the invention. The male coupling half, designated by the numeral 1 is inserted into the female coupling half 2. The cam arm is attached to the female coupling by a steel pin 3 mounted through the ear lugs 7 that are cast as integral parts of the female coupling. An extended rectangular appendage of the ear lug is the ear lug stop 9 through which a hole 10 is either drilled or cast. The cam arm 4 contains a slotted hole 11 and also contains a finger ring 8 at its extremity. A roll pin 6 secures the locking latch 5 and a torsion spring 12 to the cam arm 4.

(FIG. 3) is an expanded view of the cam arm assembly and its component parts. This view depicts the locking latch 5 as mounted onto the exterior of the cam arm 4 and held in place by means of a steel roll pin 6. A torsion spring 12 is inserted on the steel roll pin 6 and is located between the locking latch 5 and the spring brace 13 on the cam arm 4.

(FIGS. 4, 5 and 6) depict the operation the self locking cam arm assembly containing the saddle-type locking latch 5. The locking latch is shown in three different positions as it pivots past the extended rectangular appendage 9 of the ear lug stop on the female coupling body.

(FIGS. 7 and 8) depicts a complete Cam & Groove coupling assembly, containing both the male coupling 1 and the female coupling 2. The self locking cam arm assemblies are shown in the closed and locked position. These views also depict the optional use of a wire clip 14 inserted through the coupling body and the cam arm assembly.

(FIGS. 9, 10 and 11) are prior art drawings of previous patents. Each of these drawings shows the locking mechanism located on the inside of the cam arm assembly, with the locking mechanism attached to the finger ring. Also apparent is a mating member on the female coupling that protrudes into the space occupied by the cam arm assembly.

DETAILED DESCRIPTION OF THE INVENTION

The present invention pertains to the use of a spring-activated locking apparatus, referred to as the latch, and its operation as a passive locking mechanism for the cam arms of a Cam & Groove coupling. (FIGS. 4, 5 and 6) depict the operation of the latch. As the cam arm 4 is rotated to the closed position, the cam arm 4 travels in an arc around the pin 3. During this rotation, the latch 5 swings in the same arc as the cam arm but will come into contact with the end of the ear lug stop 9 before the cam arm 4 completes its closing cycle. The ear lug stop causes the latch 5 to pivot on the roll pin 6, compressing the torsion spring 12, thus changing the arc of the latch 5, relative to the cam arm 4. After the cam arm has completed its rotation, the latch 5 now has the clearance needed to pivot back to the at-rest position by means of the torsion spring 12. In the at-rest position the latch will be nestled underneath the flat end of the ear lug stop 9, as shown in (FIGS. 6, 7 and 8). With the cam arm 4 in the closed position and the latch 5 in the at-rest position, the cam arm cannot be rotated open because the end of the ear lug stop 9 obstructs the arc path of the latch 5. This obstruction prevents the cam arm from opening. To open the cam arm 4, the latch 5 must be manually pivoted back, thus allowing clearance between the latch 5 and the end of the ear lug stop 9.

The design of the latch 5 is such that once it is mounted on to the cam arm 4, it can only pivot in one direction, as shown in (FIG. 5). This design feature allows the latch 5, on the closing arc of the cam arm 4, to pivot on its own accord past the obstruction of the ear lug stop 9 and not to voluntarily pivot during the opening arc of the cam arm 4. The fact that the latch 5 pivots on the closing arc and is rigid on the opening arc of the cam arm 4 enables it to perform the act of locking the cam arm 4 in the closed position. Once the latch 4 is manually pivoted back, the obstruction is cleared and the cam arm 4 can freely open.

The optional use of a wire safety clip is shown in (FIG. 7 and FIG. 8). With the cam arm in the closed position, a wire clip 14 can be inserted into the hole 10 on the ear lug stop 9 and through the slotted hole 11 in the cam arm, as shown in (FIG. 1).

What is claimed is:

1. A cam and groove coupling joint, comprising:
    a male coupling half having a radial groove around its exterior perimeter;
    a female coupling half configured to receive said male coupling half in close fitting engagement, said female coupling half and said male coupling half secured in close fitting engagement by a plurality of cam arms positioned on said female coupling half engaging said radial groove of said male coupling half, said female coupling half including a plurality of ear lug pairs, said ear lug pairs spaced apart to receive said cam arms therebetween;
    said plurality of cam arms pivotable on a pin extending between said ear lug pairs between a first unlocked position wherein said male coupling half is insertable and removeable from said female coupling half and a second locked position wherein said male coupling half is secured in close fitting engagement with said female coupling half by said plurality of cam arms;
    a latch attached to each of said plurality of cam arms on a pin and pivotable thereabout, said latch engaging a pair of ear lug stops positioned on said ear lug pairs as said cam arm is moved from said first unlocked position to said second locked position, said latch locking said cam arm in said second locked position by engagement of said pair of ear lug stops; and,
    said latch includes a torsion spring positioned thereon to engage a spring brace on said cam arm to urge said latch to its locked position.

2. A cam and groove coupling joint, according to claim 1, wherein:
    said latch may be pivoted to a position that disengages said latch from said pair of ear lug stops and thereby allowing said cam arm to be pivoted from said second locked position to said first unlocked position.

3. A cam and groove coupling joint, according to claim 2, wherein:

said pivoting of said latch from said locked position to said position that disengages said latch from said pair of ear lug stops is in an opposite direction from that of said cam arm as it moved from said second locked position to said first unlocked position.

4. A cam and groove coupling joint, according to claim 3, including:

a hole formed in said pairs of ear lug stops, the axis of said hole parallel with said pin extending between said ear lug pairs;

a slotted hole formed in said cam arms that aligns with said hole in said pairs of ear lug stops when said cam arms are in said second locked position; and, a wire clip inserted through said hole formed in said pairs of ear lug stops and said slotted hole formed in said cam arms, said wire clip locking said cam arm in said second locked position irrespective of the position of said latch.

5. A female coupling for a cam and groove coupling joint, comprising:

a female coupling half configured to receive a male coupling half in close fitting engagement, said female coupling half securing said male coupling half in close fitting engagement by a plurality of cam arms positioned on said female coupling half engaging a radial groove formed on the exterior of said male coupling half, said female coupling half including a plurality of ear lug pairs, said ear lug pairs spaced apart to receive said cam arms therebetween;

said plurality of cam arms pivotable on a pin extending between said ear lug pairs between a first unlocked position wherein said male coupling half is insertable and removeable from said female coupling half and a second locked position wherein said male coupling half is secured in close fitting engagement with said female coupling half by said plurality of cam arms;

a latch attached to each of said plurality of cam arms on a pin and pivotable thereabout, said latch engaging a pair of ear lug stops positioned on said ear lug pairs as said cam arm is moved from said first unlocked position to said second locked position, said latch locking said cam arm in said second locked position by engagement of said pair of ear lug stops; and, said latch includes a torsion spring positioned thereon to engage a spring brace on said cam arm to urge said latch to its locked position.

6. A female coupling for a cam and groove coupling joint, according to claim 5, wherein:

said latch may be pivoted to a position that disengages said latch from said pair of ear lug stops by a user with a single hand and thereby allowing said cam arm to be pivoted from said second locked position to said first unlocked position.

7. A female coupling for a cam and groove coupling joint, according to claim 6, wherein:

said pivoting of said latch from said locked position to said position that disengages said latch from said pair of ear lug stops is in an opposite direction from that of said cam arm as it moved from said second locked position to said first unlocked position.

8. A female coupling for a cam and groove coupling joint, according to claim 7, including:

a hole formed in said pairs of ear lug stops, the axis of said hole parallel with said pin extending between said ear lug pairs;

a slotted hole formed in said cam arms that aligns with said hole in said pairs of ear lug stops when said cam arms are in said second locked position; and, a wire clip inserted through said hole formed in said pairs of ear lug stops and said slotted hole formed in said cam arms, said wire clip locking said cam arm in said second locked position irrespective of the position of said latch.

* * * * *